(12) United States Patent
Green et al.

(10) Patent No.: US 9,109,740 B2
(45) Date of Patent: *Aug. 18, 2015

(54) MULTI-LAYERED PATCH SYSTEM AND METHOD

(71) Applicant: TIMBERLINE TOOL, L.L.C., Kalispell, MT (US)

(72) Inventors: Kenneth H. Green, Whitefish, MT (US); Willie E. Rochefort, Corvallis, OR (US); Nicholas Wannenmacher, Corvallis, OR (US); Kevin Edward Harris, Salem, OR (US); Staci Alix Van Norman, Broomfield, CO (US)

(73) Assignee: Timberline Tool, L.L.C., Kalispell, MT (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/669,042

(22) Filed: Nov. 5, 2012

(65) Prior Publication Data

US 2013/0061970 A1   Mar. 14, 2013

Related U.S. Application Data

(63) Continuation-in-part of application No. 12/201,697, filed on Aug. 29, 2008, now Pat. No. 8,329,291, which is a continuation-in-part of application No. 11/829,374, filed on Jul. 27, 2007, now Pat. No.

(Continued)

(51) Int. Cl.
*B32B 7/12* (2006.01)
*B32B 15/04* (2006.01)
*F16L 55/18* (2006.01)

(Continued)

(52) U.S. Cl.
CPC . *F16L 55/18* (2013.01); *B32B 3/08* (2013.01); *B32B 27/065* (2013.01); *B32B 27/08* (2013.01); *B32B 27/12* (2013.01); *B32B 27/24* (2013.01);

(Continued)

(58) Field of Classification Search
CPC .... B32B 27/12; B32B 27/24; B32B 2307/31; B32B 2556/00; B32B 27/065; B32B 27/08; B32B 3/08; B32B 2262/103
USPC ............. 428/343, 346, 347, 352, 354, 355 R
See application file for complete search history.

(56) References Cited

U.S. PATENT DOCUMENTS 232,428 A   9/1880   Whiting
243,480 A   6/1881   Whiting (Continued)

FOREIGN PATENT DOCUMENTS

CN   1646655   7/2005
CN   101223029   7/2008

(Continued)

OTHER PUBLICATIONS

Office Action and Search Report dated Mar. 27, 2013, for related application No. CN 200980142965.

*Primary Examiner* — Victor Chang
(74) *Attorney, Agent, or Firm* — Dorsey & Whitney LLP; Wendy N. Peterson, Esq.

(57) ABSTRACT

A multi-layered patch including a backing layer, an outer layer, polymer adhesive layers that include a polymer foam and a solvent, and a heating layer that includes a polymer substrate, a heating element and a sensor, and methods of making and using the multi-layered patch.

20 Claims, 10 Drawing Sheets

Related U.S. Application Data 8,057,895, which is a continuation of application No. PCT/US2006/003387, filed on Jan. 31, 2006.

(60) Provisional application No. 60/648,573, filed on Jan. 31, 2005.

(51) Int. Cl.
*B32B 27/12* (2006.01)
*B32B 27/24* (2006.01)
*B32B 27/06* (2006.01)
*B32B 27/08* (2006.01)
*B32B 3/08* (2006.01)

(52) U.S. Cl.
CPC ....... *B32B 2262/103* (2013.01); *B32B 2307/31* (2013.01); *B32B 2556/00* (2013.01)

(56) References Cited

U.S. PATENT DOCUMENTS

| | | |
|---|---|---|
| 455,414 A | 7/1891 | Searle |
| 458,176 A | 8/1891 | Lemp |
| 1,100,067 A | 6/1914 | Fish |
| 1,817,988 A | 8/1931 | Klamt |
| 2,241,021 A | 5/1941 | Riebe |
| 2,283,933 A | 5/1942 | Jones et al. |
| 2,850,926 A | 9/1958 | Jobe |
| 2,853,908 A | 9/1958 | Logan |
| 3,117,904 A | 1/1964 | Black |
| 3,170,322 A | 2/1965 | Cavanaugh |
| 3,266,287 A | 8/1966 | Gill |
| 4,534,817 A | 8/1985 | O'Sullivan |
| 4,574,610 A | 3/1986 | Hull et al. |
| 4,650,236 A | 3/1987 | Haney |
| 4,900,078 A | 2/1990 | Bloch |
| 4,943,684 A | 7/1990 | Kramer |
| 5,107,095 A | 4/1992 | Derbyshire |
| 5,119,665 A | 6/1992 | Stafford |
| 5,382,313 A | 1/1995 | Eminger |
| 5,971,378 A | 10/1999 | Sweeney |
| 6,450,555 B1 | 9/2002 | Collister et al. |
| 6,452,138 B1 * | 9/2002 | Kochman et al. ............ 219/549 |
| 6,655,417 B2 | 12/2003 | Kurmis |
| 6,707,007 B1 | 3/2004 | Siddoway |
| 6,777,080 B2 | 8/2004 | Khandpur et al. |
| 6,941,628 B1 | 9/2005 | Silverfox |
| 7,337,648 B2 | 3/2008 | Green |
| 8,353,995 B2 | 1/2013 | Stout et al. |
| 2008/0026214 A1 | 1/2008 | Green |
| 2009/0050256 A1 | 2/2009 | Green |

FOREIGN PATENT DOCUMENTS

| | | |
|---|---|---|
| DE | 33 35 728 | 4/1985 |
| EP | 0 532 391 | 3/1993 |
| EP | 0 779 465 | 6/1997 |
| EP | 2 128 512 | 12/2009 |
| FR | 2 231 916 | 12/1974 |
| FR | 2 613 811 | 10/1988 |
| FR | 2 728 494 | 6/1996 |
| JP | 60-110792 | 7/1985 |
| JP | 04-048406 | 4/1992 |
| WO | WO 2006/083857 | 8/2004 |
| WO | WO 2005/023494 | 3/2005 |

* cited by examiner

MULTI-LAYERED PATCH SYSTEM AND METHOD

CROSS REFERENCE TO RELATED APPLICATIONS

This application is a continuation-in-part application and claims priority to U.S. application Ser. No. 12/201,697, now U.S. Pat. No. 8,329,291, filed on Aug, 29, 2008, which is a continuation-in-part of U.S. application Ser. No. 11/829,374, now U.S. Pat. No. 8,057,895, filed on Jul. 27, 2007, which claims priority to PCT/US2006,003387, filed on Jan. 31, 2006, which claims priority to U.S. application Ser. No. 60/648,573, filed on Jan. 31, 2005.

BACKGROUND

Various circumstances require repair of plastic, i.e., polyethylene piping, tanks, or vessels. Repair or connection can be affected by applying an adhesive or composite directly to the crack in the pipe, tank, or vessel. Alternatively, a multipart sleeve can be placed over the defect or pipe connection and sealed about it. Still another alternative when a pipe is damaged is to cut out the damaged area and replace it with a new section of piping. Yet another alternative is to "fusion weld" the plastic piping together as is known in the art. Regarding tanks and vessels, defects are typically repaired using "classical" patching methods such as epoxy or resin applied to a glass or other fiber/mesh to form a composite.

The afore-mentioned methods have several disadvantages. For example, application of an adhesive or composite to a crack tends to not provide a uniform seal. Also, the application may involve an extended "cure" time in which pressure exerted within the pipe may force the material out of the crack. For example, cure times can range from 2-3 hours to 1-7 days for full cure.

With regard to application of a multipart sleeve to the damaged area, this may often involve significant labor to excavate the area about the pipe so that the sleeve can be placed around the damaged area.

Cutting of the pipe to undertake repairs is often not desirable, especially when the pipe contains a liquid, such as oil or water, or a flammable gas. The operator would need to shut off the liquid or gas and purge the pipe to avoid contamination of the liquid or risk a gas explosion. This is generally not acceptable for most applications. Additionally, as mentioned above, excavation about the section to be replaced would be required. This can prove to be quite costly, both in terms of time as well as other financial resources.

Welding, including fusion welding, can also be problematic. If the pipe contains or contained a flammable substance, the arc, spark, open flame and/or relatively high temperatures typically involved in welding could ignite the material. Again, excavation about a large area might be required to access the repair site and can be costly.

With regard to the repair of damaged tanks or vessels, specifically, the defects are often overlaid with materials to match the original substrate, or, if the damage is too great they must be replaced. If the defects are overlaid with substrate matching materials, the overlaid areas are typically only thermally welded around the perimeter and do not provide the strength of the original tank or vessel. Additionally, there are no current effective adhesive methods to repair defects in polyolefins. For example, current patching methods for defects in polyolefins will often fail to adhere to the surface of the tank or vessel, or will be patched using dissimilar patching materials that can be problematic.

Thus, there exists a need to provide an improved system and method to repair plastic piping, tanks, or vessels.

SUMMARY

The present invention comprises new composites and new methods to use these composites to repair and/or connect pieces of plastic piping, holding tanks, bulkheads, plastic vessels and the like, that overcome one or more of the above-noted disadvantages.

Generally, the composites and methods of the present disclosure may improve the strength of the bond, the curing rate, the ease of application, and the time required for application.

In one embodiment, the present invention comprises a multi-layer patch (MLP) that includes at least a first and second layer. The first layer is a polymer adhesive; this includes gels formed from dissolved polymers, solvent swollen polymer films, or solvent saturated polymer foams. The second layer is a support film, or backing layer, that becomes intimately incorporated with the first polymer adhesive layer upon application of heat.

In some embodiments, the present invention comprises a composite comprising three or, optionally, four layers when an envelope packaging configuration is desired. One layer, for example the bottom, outermost layer in contact with the pipe to be repaired, can be comprised of a suitable film that is intimately incorporated into the polymer adhesive layer, and ultimately into the bond after curing. Another layer, for example the top, outermost layer can comprise a suitable material (e.g., a film) that when combined with the bottom, outermost layer forms a protective envelope for the patch assembly.

In some embodiments, both the top, outermost and bottom, outermost layers become incorporated into the polymer adhesive layer during curing, and ultimately become part of the bond. In some embodiments, only the bottom layer becomes incorporated into the polymer adhesive layer; the top layer is of a material or a thickness such that it is not completely incorporated into the polymer adhesive layer, but actually results in a bonded substrate after the curing process. In some embodiments, the top layer can be a reinforced plastic. The reinforcing material included in the top layer can, for example, be an ultrahigh molecular weight polyethylene, such as SPECTRA® brand, or a polyaramid fiber, such as KEVLAR® brand, or any other appropriate reinforcing material. In some embodiments, the polymer adhesive layer could include suitable reinforcing materials; these materials could be randomly arranged individual fibers, a layer of continuous fibers (i.e., a sheet), a fiber mesh, or they could comprise a distinct layer of either continuous fibers or a woven or nonwoven fiber, or metal wires or mesh. In one embodiment, the reinforcing materials may further include a coating, such as for example, a polytetrafluoroethylene coating (e.g., TEFLON® coating).

In some embodiments a metal layer, e.g., a thin film, mesh, or sputtercoated film, is applied or deposited on the surface of the adhesive layer polymer to act as a susceptor for radio frequency to absorb electromagnetic energy. In some preferred embodiments, the bond interface is thus heated by using the susceptor—radio frequency combination.

Generally, the polymer adhesive layer is a combination of a polyolefin, a polyamide, a polyester, a polyvinyl chloride (PVC) or a poly-acrylonitrile-butadiene-styrene (ABS) and a solvent. Various molecular weights of the polymer adhesives are contemplated within the scope of the invention.

Suitable solvents may include those that will dissolve a portion of the polymer, or saturate a polymer foam, such that the polymer is present in the gel, or foam, from between about 2 to about 60% by weight. Other suitable solvents include those that will swell the polymer such that the polymer is present in the swollen film from between about 15 to about 60% by weight. Depending on the polymer chosen, suitable solvents comprise tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, 1,2,4-trichlorobenzene or combinations thereof. Alternatively, any similar solvents, as are known in the art, may be employed.

Generally, the second support film layer is a polyolefin, a polyamide, a polyester, a PVC or an ABS. Various molecular weights of the support film polymer layer are contemplated within the scope of the invention.

The MLP can further include a third layer that acts as a barrier or release film, which is in contact with the polymer adhesive layer. In one aspect the third layer is of a type that can be intimately incorporated into the first polymer adhesive layer upon application of heat. Suitable films include polyolefins, polyamides, polyesters, polyvinyl chloride (PVC), poly-acrylonitrile-butadiene-styrene (ABS), polyketone, fluoropolymer, polyurethane or combinations thereof. Various molecular weights of the polymers composing the film layers are contemplated within the scope of the invention. In another aspect the third layer is a release material and can be a film, a coating or a powder.

A solvent containing ampoule is used in some embodiments to deliver solvent to the MLP assembly just prior to the application of the MLP to the repair site. The ampoule may be solvent resistant and integrated into the MLP so the ampoule can be broken inside the assembly and allow the solvent to saturate the foam polymer adhesive layer prior to applying the patch. Alternatively, a solvent connection/injection port, whereby solvent can be delivered into the MLP assembly just prior to application, may be integrated into the MLP.

The MLP of the present disclosure can be applied to, for example, plastic piping to facilitate connection of ends or the repair of breaks, holes, cracks, fissures, gouges, scrapes, and the like in the piping. Alternatively, the MLP of the present disclosure can be applied to any polymer repair application, such as for example, polymer tanks and vessels. Further, the MLP of the present disclosure can be used to bond garment fabrics to high strength polymeric materials.

In some embodiments, the MLP further comprises a sensor or a plurality of sensors.

In various embodiments, the MLP comprises a backing layer, a first polymer adhesive layer comprising a polymer foam and a solvent, a heating layer comprising a polymer substrate, a heating element and at least one sensor, a second polymer adhesive layer comprising a polymer foam and a solvent, and an outer layer.

In one aspect, the MLP further comprises a solvent injection port.

In some aspects, the heating element comprises metal wire, metal mesh or wire traces.

In another aspect, the heating element is attached to the polymer substrate by stitching.

In some aspects, the heating element is stitched onto the polymer substrate in a pattern including at least one pocket area.

In one aspect, the at least one sensor is in the at least one pocket area.

In various aspects, the at least one sensor comprises at least one thermal measuring device.

In another aspect, the polymer substrate comprises polyethylene.

In some aspects, the polymer substrate comprises a polymer film, a polymer non-woven fabric or a polymer mesh.

In some embodiments, the solvent in the first polymer adhesive layer or the second polymer adhesive layer comprises decalin, tetralin, tetrachloroethylene, tetrachloroethane, xylene, or combinations thereof.

In various embodiments, the polymer foam of the first polymer adhesive layer or the second polymer adhesive layer is saturated with the solvent.

In one embodiment, the polymer foam of the first polymer adhesive layer or the second polymer adhesive layer comprises polyethylene.

In some aspects, the polyethylene of the first polymer adhesive layer or the second polymer adhesive layer comprises low density polyethylene, medium density polyethylene, high density polyethylene, ultrahigh molecular weight polyethylene or combinations thereof.

In various aspects, the backing layer, the polymer substrate of the heating layer, or the outer layer comprises low density polyethylene, medium density polyethylene, high density polyethylene, ultrahigh molecular weight polyethylene or combinations thereof.

In one aspect, the heating element is an electrically heated element.

In another embodiment, the MLP further comprises a radio-frequency identification device.

In some embodiments, the MLP comprises a backing layer comprising a polymer, a first polymer adhesive layer comprising a combination of polyethylene foam and solvent at room temperature, a heating layer comprising a polymer substrate, a heating element and a thermal measuring device, a second polymer adhesive layer comprising a combination of polyethylene foam and solvent at room temperature, and an outer layer comprising a polymer.

In various aspects, the at least one thermal measuring device comprises at least one resistance temperature detector, thermocouple, or combinations thereof.

In another embodiment the MLP comprises a backing layer comprising polyethylene, a first polymer adhesive layer comprising a combination of high density and ultrahigh molecular weight polyethylene foam and solvent at room temperature, a heating layer comprising polyethylene, an electrically heated element and at least one thermal measuring device, a second polymer adhesive layer comprising a combination of high density and ultrahigh molecular weight polyethylene foam and solvent at room temperature, and an outer layer comprising polyethylene.

In some aspects the MLP further comprises a radio-frequency identification device.

In some embodiments, the MLP comprises, a backing layer, a first polymer adhesive layer comprising a polymer foam and a solvent, a heating layer comprising a polymer substrate, a heating element and at least one radio-frequency identification device, a second polymer adhesive layer comprising a polymer foam and a solvent, and an outer layer.

The MLPs of the invention provide advantages over current repair/adhesive techniques. For example, a uniform seal is achieved with the composites of the invention. The materials have enough integrity that they do not seep into the crack, for example, and lose strength over time.

DETAILED DESCRIPTION

Any reference to "the invention" herein shall not be construed as a generalization, limitation or characterization of any subject matter disclosed herein and shall not be considered to be an element or limitation of the appended claims except if and/or where explicitly recited in a claim(s). With regard to fastening, mounting, attaching or connecting components, unless specifically described as otherwise, conventional mechanical fasteners and methods may be used. Other appropriate fastening or attachment methods include adhesives, welding and soldering, including with regard to an electrical system, if any. In embodiments with electrical features or components, suitable electrical components and circuitry, wires, wireless components, chips, boards, microprocessors, inputs, outputs, displays, control components, etc. may be used. Generally, unless otherwise indicated, the materials for making embodiments and/or components thereof may be selected from appropriate materials such as metal, metallic alloys, ceramics, plastics, etc. Unless otherwise indicated specifically or by context, positional terms (e.g., up, down, front, rear, distal, proximal, etc.) are descriptive not limiting. Same reference numbers are used to denote same parts or components.

The present invention comprises new MLPs and methods to use the new MLPs on polymer repair applications and/or adhesion applications. For example, the MLPs may be used to connect, repair, or reinforce plastic piping or to repair a defect in a tank or vessel. The MLPs may be pre-formed in flat or any curved or any bent manner or formed in a flat or any curved or any bent manner at place of use. Any suitable form of the MLP may be used on repair and/or adhesion applications of substrates in round, oval, square, flat, triangular or any shape encountered in the field. As a further example, the MLPs may be used to bond garment fabrics to high strength polymeric materials.

Figure 1:
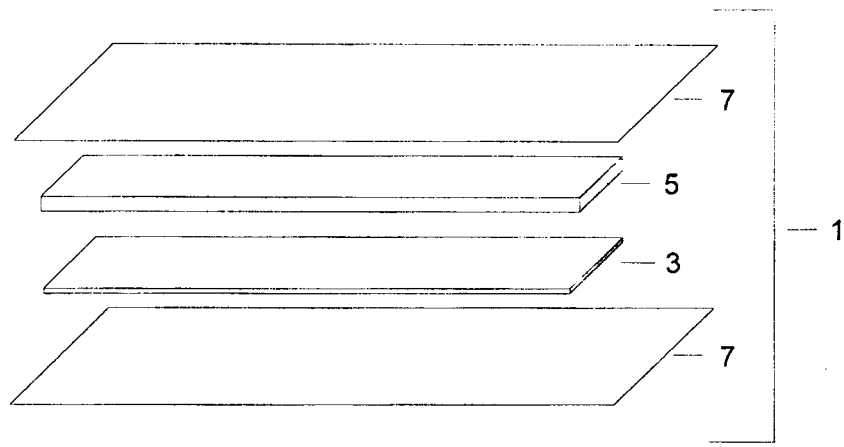
FIGS. 1, 1A, and 1B depict one aspect of an MLP of the present disclosure with and without the optional release or envelope barrier films.
Figure 1A:
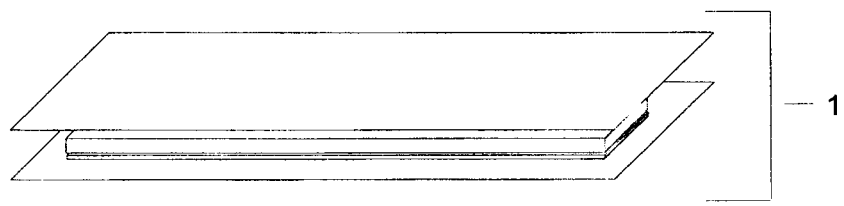
Figure 1B:

FIGS. 1, 1A, and 1B depict one aspect of the present invention comprising a MLP 1 that includes at least a first layer 3 and second layer 5 with the optional third and/or fourth layers 7. The first layer 3 is a polymer adhesive layer. The second layer 5 is a support film or thicker substrate (backing layer) whose surface becomes intimately incorporated with the first polymer adhesive layer upon application of heat. The optional third and/or fourth layer(s) 7 can either be release films or envelope barrier films.

The phrase "intimately incorporated" is intended to mean that upon physical exertion, such as heating of the first layer 3 and second layer 5 against a substrate (not shown), the solvent remaining in the first layer 3 (which also may be referred to and/or thought of as the polymer adhesive layer 3 or adhesive layer 3) will cause the support film 5 to become homogeneously or heterogeneously incorporated with the other layer(s). Not to be limited by theory, the stressing of the two layers effectively causes the two layers to become a single layer. Temperatures used to accomplish this may be from about 5 to 90° C. below the softening/melting point of the virgin polymer (i.e., no solvent present). Table 1 provides an exemplary list of polymer-solvent pairs, including either the melting or glass transition temperatures of the virgin polymers as well as the melting or glass transition temperatures of the polymer-solvent pairs. For example, from Table 1, it is seen that an ultra high molecular weight polyethylene polymer adhesive based MLP may be heated to about 80 to about 120° C. when connecting or repairing a polyethylene substrate, depending on the solvent used. It is to be understood that Table 1 is an exemplary list of polymer-solvent pairs and in no way limits the scope of the present disclosure.

TABLE 1

| Polymer | Solvent | Virgin* Tg(° C.) | Virgin* Tm(° C.) | Solvent** Tg(° C.) | Solvent** Tm(° C.) |
|---|---|---|---|---|---|
| Polypropylene | Benzene | — | 168 | — | N/A |
| | Cyclohexane | — | | — | N/A |
| | Decalin | — | | — | 163 |
| | Tetralin | — | | — | 104 |
| | Toluene | — | | — | 97 |
| | 1-Chloronaphthalene | — | | — | 137 |
| Polyvinyl Chloride | Cyclohexanone | 82 | — | 60 | — |
| | Tetrahydrofuran | | — | 53 | — |
| ABS | Toluene | 105 | — | 84 | — |
| Nylon 12 | m-Cresol | — | 187 | — | 100 |
| Polybutylene | Benzene | — | 125 | — | 127 |
| | Ethylcyclohexane | | | — | 125 |
| | Decalin | | | — | 102 |
| | Heptane | | | — | 127 |
| | Nonane | | | — | 128 |
| | 1,2,4-Trichlorobenzene | | | — | 105 |
| Polyethylene (MDPE) | 1-Chloronaphthalene | — | 127 | — | 116 |
| | Decalin | | | — | 120 |
| | Tetralin | | | — | 104 |

TABLE 1-continued

| Polymer | Solvent | Virgin* Tg(° C.) | Virgin* Tm(° C.) | Solvent** Tg(° C.) | Solvent** Tm(° C.) |
|---|---|---|---|---|---|
| | 1,2,4-Trichlorobenzene | — | | | 112 |
| | Xylene | — | | | 79 |

Term Meaning:
Virgin* Only polymer material present in pan
Solvent** Polymer and solvent present in pan In some embodiments, the polymer adhesive layer and/or film layers are incorporated into a bond layer (along with the surface of the substrate being repaired) when the adhesion process is complete.

Generally, the first layer, or polymer adhesive layer 3, may be a polyolefin, a polyamide, a polyester, a PVC, an ABS, or combinations thereof, and a solvent. Various molecular weights of the polymer adhesive layer are contemplated within the scope of the invention. Additionally, if the polymer is polyethylene, it may have low, medium or high density, such as a low density (LDPE), medium density (MDPE), high density (HDPE), very high molecular weight (VHMWPE), or ultra high molecular weight polyethylene (UHMWPE).

Suitable solvents include those that will dissolve a weight percentage of the polymer such that the polymer is present in the polymer adhesive layer 3 from between about 2 and about 60% by weight. For example, useful solvents to solvate or infuse an adhesive layer 3 comprising a polymer comprise tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, and/or 1,2,4-trichlorobenzene, and similar solvents or combinations thereof, as are known in the art.

In some embodiments, the adhesive layer 3 comprises a gel. In the gel formation process, a predetermined amount of polymer (powder, prills, pellets, etc.) is typically placed into the solvent and heated for about 30 minutes to 12 hours with some form of agitation. In the case of polyethylene, the solution is heated between about 100° C. to about 145° C. for up to a few hours. The resulting solution is cooled and becomes a gel. Before or during the cooling process, the viscous solution is poured onto a non-stick surface and pressed flat so that a gel forms that is between about 0.5 and about 6 mm thick.

In another embodiment, the adhesive layer 3 comprises a swollen polymer film. A piece of polymer film is cut to the desired size (the film swells approximately 40-60% in each direction). In the case of polyethylene, the polyethylene can be low (LDPE), medium (MDPE), high density (HDPE), very high molecular weight (VHMWPE), ultra high molecular weight (UHMWPE), or combinations thereof. The polymer film is placed in a hot solvent bath at from about 95 to about 115° C. and allowed to swell for the desired time (to achieve a 15-60 weight percent (wt %) swollen polymer film). The swollen film is then removed, chilled, and stored for later use.

In a further embodiment, the adhesive layer 3 comprises a polymer foam. The foam may be soaked in, and saturated with, the desired solvent to be used for adhesive layer 3 of the MLP. Polymer foams comprise, for example, a polyolefin, a polyamide, a polyester, a polyvinyl chloride, a poly-acrylonitrile-butadiene-styrene, or combinations thereof. Use of polymer foam may be advantageous because saturation of the foam with the desired solvent may be carried out at room temperature. Suitable solvents for combining with polymer foams comprise tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, and/or 1,2,4-trichlorobenzene, and similar solvents or combinations thereof, as are known in the art.

Generally, the second layer, or support film layer 5, is a polyolefin, a polyamide, a polyester, a PVC or an ABS. Various molecular weights of the polymers of this support film (backing layer) are contemplated within the scope of the invention. In some embodiments, the support film layer 5 can be a fiber reinforced plastic. Typically, the support film layer 5 is selected so that it is compatible with the polymer adhesive layer 3 and/or the polymer repair/adhesion application to which it will be applied.

In one aspect, the MLP 1 may further include one or more outer layers 7. Outer layers comprise a release material and can be a film, a coating, or a powder, such as those known in the art. If a release coating or powder is used, the amount is minimal and does not substantially affect the physical properties of the polymer adhesive layer 3. In one embodiment, outer layers 7 may be films comprising at least one of a polyolefin, a polyamide, polyimide, a polyester, a polyvinyl chloride, a poly-acrylonitrile-butadiene-styrene or combinations thereof.

In another aspect, the one or more outer layers 7 are a protective envelope barrier films. The outer layer(s) 7 may be applied to the adhesive layer 3 only, or to the entire adhesive-support film composite, such that the outer layer(s) 7 at least partially surrounds a portion of the adhesive layer 3 and support film 5. The envelope barrier film may be thought of as a packet, bag, or baggie, or surrounding structure which may be open on one or more sides. Thin envelope barrier films that are compatible with the other polymers of the MLP and the substrate can be incorporated into the final MLP-repaired substrate bond.

Figure 2:
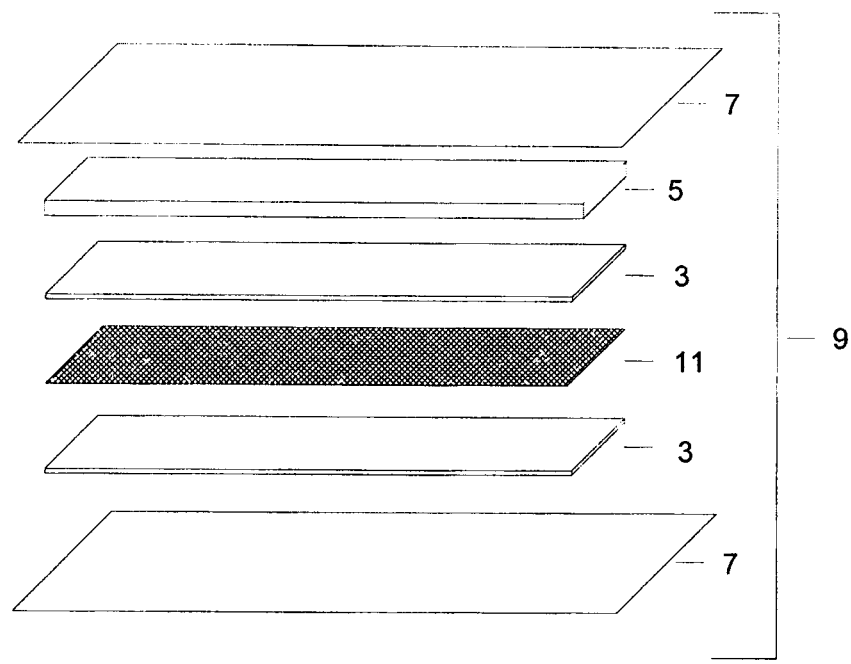
FIG. 2 depicts another aspect of the disclosure including a fiber or metal reinforced MLP.

FIG. 2 depicts an embodiment of a MLP 9. MLP 9 comprises a first layer comprising a polymer adhesive layer 3 that includes a reinforcing material 11, such as fibers, cloth mesh, metal wires or mesh, polymer mesh, or wire traces. Suitable reinforcing materials 11 may further include a polyethylene, a polyester, a nylon, or a polyaramide fiber, such as KEVLAR® brand, available from E. I. du Pont de Nemours and Company (Wilmington, Del.), or combinations thereof. In one embodiment, reinforcing material 11 may be selected such that the reinforcing material 11 does not dissolve in the polymer adhesive layer 3. For example, a high modulus polyethylene fiber can be used and is commercially available from Honeywell, USA, (Morristown, N.J.) and is known as SPECTRA® brand fiber. In one embodiment, reinforcing material 11 may be further used as a heating element. In some embodiments, the second layer 5, as in FIG. 1, comprises a support film or backing layer that can be intimately incorporated with the first polymer adhesive layer 3 upon application of heat. The MLP 9 can also include optional outer layer(s) 7. Second layer 5 and/or optional outer layer(s) 7 may be substantially similar to the same components described with reference to FIG. 1. For purposes of illustration, FIG. 2 depicts the reinforced polymer adhesive layer 3 separated into three components. It is to be understood, however, that reinforcing material 11 may be incorporated/embedded within the polymer adhesive layer 3 such that the adhesive layer 3 comprises a unitary structure.

In one embodiment, the reinforcing material 11 can be incorporated into the polymer adhesive 3 by adding the reinforcing material 11 to the viscous gel material while the gel is curing, e.g., cooling.

Figure 3:
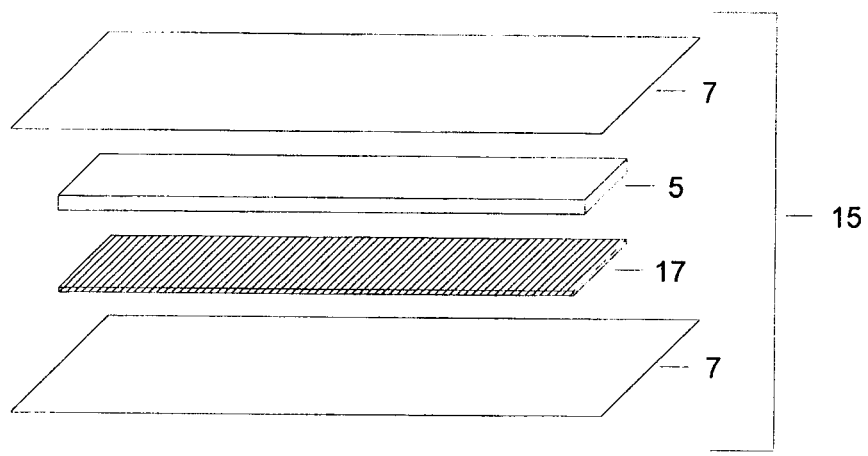
FIG. 3 depicts another aspect of the disclosure including an internally, heated MLP.

FIG. 3 depicts another aspect of the present invention, i.e., comprising a MLP 15 that includes at least a first heated layer 17 and second layer 5 with the optional outer layer(s) 7. In some embodiments, the heated layer 17 can be used as a combination reinforcing material and heat source. In one embodiment, the heated layer 17 comprises a woven or non-woven metal wire mesh or wire traces, which can be used as a heated grid or pattern to fuse the support film/backing layer 5 to the substrate. For example, opposite edges of a wire mesh may be connected to an electrical power source such that the wire mesh can be used as a resistance heated grid, which in turn, can be used to bring the interface of the support film or backing layer 5 and the substrate to their melting temperature. In further embodiments, the heated layer 17 comprises a susceptor comprised of, for example, a thin mesh, film, or metallic coating layer, which can be used to heat the bond interface by the application of radio frequency (RF) energy to the MLP. The combination of the melted surfaces and an applied squeezing force may cause the two materials to bond and form one continuous layer with the heated layer 17 being embedded in this bond.

In some embodiments, MLP 15 may further comprise a polymer adhesive layer, such as those described in previous embodiments. For example, in one embodiment, the heating layer 17 may be applied directly to a polymer adhesive layer.

In further embodiments, MLP 15 comprises an adhesive layer comprising a solvent swollen polymer film or solvent saturated polymer foam with wire mesh or wire traces 17, where the wire mesh or wire traces can be used to heat the swollen film to cure the support film 5—substrate bond interface. Such resistance wires may be attached to the surface of the film by, for example, stitching. Alternatively, the resistance wires may be molded into the film layer during the film manufacturing process or be sandwiched between two layers of film. In some embodiments, the polymer film choice may depend on the materials being bonded. For example polyethylene substrate connections or repairs would be paired with the appropriate polymer film such as low (LDPE), medium (MDPE), high density (HDPE), very high molecular weight (VHMWPE), ultra high molecular weight polyethylene (UHMWPE), or combinations thereof. As a further example, a non-swollen film with the same type of resistance wires may be used to melt and fuse the support film 5 and substrate material.

In some embodiments, a solvent containing ampoule may be used to deliver solvent to the MLP assembly prior to the application of the MLP to the repair site. For example, the ampoule may be solvent resistant and integrated into the MLP such that the ampoule can be broken inside the assembly and accommodate solvent saturation of the foam polymer adhesive layer prior to applying the patch. In one embodiment, ampoules may be comprised of nylon, a fluoropolymer, and the like.

In further embodiments, solvent delivery may be accomplished by using a solvent connection/injection port or opening integrated into the MLP. In such embodiments, just prior to application, solvent can be delivered into the MLP via the solvent injection port or opening.

MLPs 1, 9 and/or 15 may be applied to a plastic pipe with a Clamp and Repair Tool as described in U.S. Pat. No. 7,337,648, entitled "Clamp and Repair Tool" by Kenneth H. Green, issued on Mar. 4, 2008, the contents of which are incorporated herein by reference in their entirety. For example, MLPs 1, 9 and/or 15 may be placed in the jaws of the clamp and contacted with the plastic pipe surface. Pressure and heat are applied from and/or by the clamp to accomplish the connection or repair.

MLPs 1, 9, and/or 15 provide advantages over other adhesive systems. For example, they are easy to handle since there is no free flowing solvent present. If the MLP 1 or 9 includes outer layer(s) 7 then the resultant barrier film envelope can be hermetically sealed so that outgassing of the solvent is not noticeable. The MLP 15 allows for the connection or repair to be conducted during low temperature conditions, where surface heating would not be adequate to provide the proper bond interface temperatures.

Figure 4:
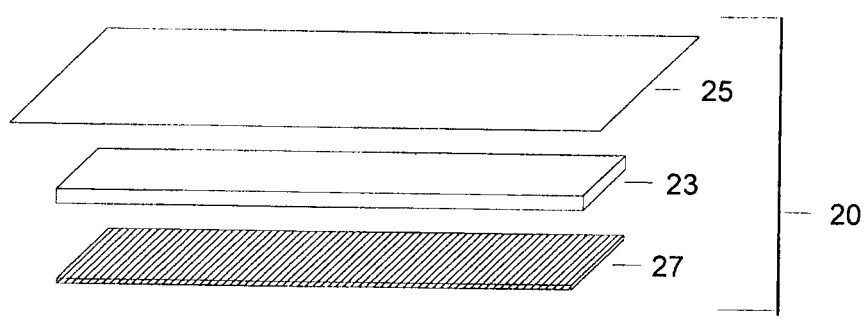
FIG. 4 depicts a further aspect of an MLP of the present disclosure.

FIG. 4 depicts a MLP 20 in accordance with an alternative aspect of the present disclosure. Generally, MLP 20 comprises a multilayer composite material that includes the benefits of both a garment fabric and a high strength polymer. In some embodiments, MLP 20 comprises a polymer adhesive layer 23, garment fabric layer 25, and high strength polymeric material layer 27. Polymer adhesive layer 23 may be comprised of a polyolefin, a polyamide, a polyester, a PVC, an ABS, or combinations thereof, and a solvent. Polymer adhesive layer 23 may be in the form of a polymer gel, swollen film, or foam. Garment fabric layer 25 comprises any woven or non-woven garment fabric, such as for example, cotton, wool, denim, and the like. Alternatively, fabric layer 25 comprises any natural or synthetic fabric. High strength polymeric material layer 27 comprises, for example, SPECTRA® brand meshes or mats.

In some embodiments, bonds between the garment fabric layer 25 and the high strength polymer material layer 27 may be achieved by applying heat to two or more layers of these materials interspersed with polymer adhesive 23. By heating the layers, the dissimilar materials may be permanently bonded into a superior fabric composite. Advantages of the fabric composite include, but are not limited to, the natural wicking action of cotton and the thermal benefits of wool combined with the strength and cut and penetration resistance of high strength polymers.

Figure 5:
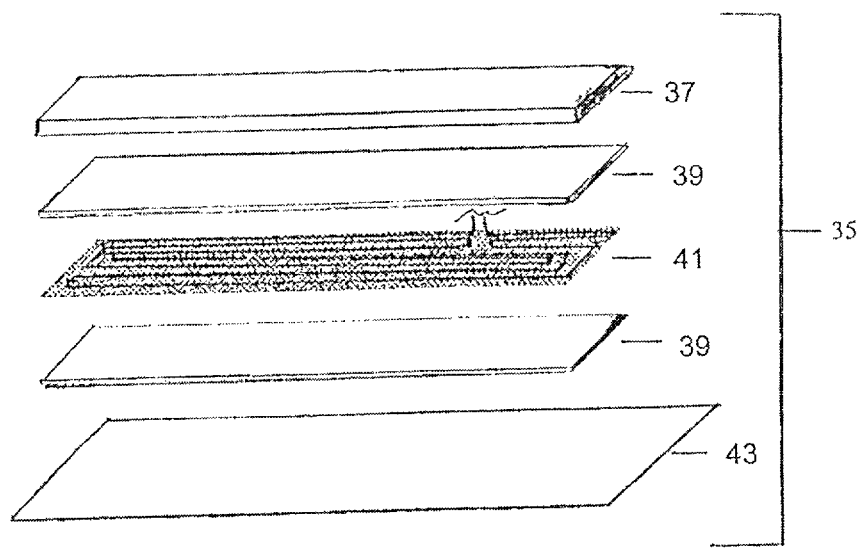
FIG. 5 depicts another aspect of an MLP of the present disclosure including a heating layer.

FIG. 5 depicts a MLP 35 in accordance with an alternative aspect of the present disclosure. Generally, MLP 35 comprises a backing layer 37, at least one polymer adhesive layer 39, a heating layer 41, and an outer layer 43.

In some embodiments, the backing layer 37 comprises a polymer. The polymer may be polyolefin, a polyamide, a polyester, a PVC or an ABS. Various molecular weights of the polymers of the backing layer 37 are contemplated within the scope of the disclosure. In some embodiments, the backing layer 37 comprises polyethylene. In various embodiment the backing layer 37 comprises low (LDPE), medium (MDPE), high density (HDPE), very high molecular weight (VHMWPE), ultra high molecular weight polyethylene (UHMWPE), or combinations thereof. In one embodiment, the backing layer 37 comprises HDPE. In various embodiments, the backing layer 37 may be pre-formed to a specified shape to accommodate a workpiece in need of repair. In some embodiments, the backing layer 37 may be injection molded.

In some embodiments, the polymer adhesive layer 39 comprises a polymer foam and a solvent. Some embodiments comprise either a single or a plurality or polymer adhesive layer(s). In one aspect, for example, there is a first polymer adhesive layer 39 and a second polymer adhesive layer 39. The polymer adhesive layers 39 comprise the same or different polymers depending on the adhesive application end use. A single solvent or a solvent blend may be used based on the polymer(s) chosen. The polymer foam may be soaked in solvent(s). In various embodiments, the polymer foam may be saturated with the solvent. Solvent delivery systems such as those described in other embodiments above, including ampoules, connection/injection ports or openings integrated into the MLP may be used. In other embodiments, solvent delivery systems, such as delivery of solvent by syringe or other delivery systems known in the art may also be used to add solvent to the polymer foam.

In some embodiments, polymer foams comprise a polyolefin, a polyamide, a polyester, a polyvinyl chloride, a poly-acrylonitrile-butadiene-styrene, or combinations thereof. In one embodiment, the polymer foam includes polyethylene. In some embodiments the polyethylene comprises low (LDPE), medium (MDPE), high density (HDPE), very high molecular weight (VHMWPE), ultra high molecular weight polyethylene (UHMWPE), or combinations thereof. In one embodiment, the polyethylene comprises high density polyethylene (HDPE), ultra high molecular weight polyethylene (UHMWPE), or combinations thereof. In some embodiments, the porosity of the polymer foam may be about 80% to about 90% porosity. In other embodiments, the polymer foam may be about 85% porosity. Polymer foam is available from Entek International LLC (Lebanon, Oreg.). Use of polymer foam may be advantageous because saturation of the foam with the desired solvent may be carried out at room temperature or ambient temperature. In some embodiments, solvents suitable for combining with polymer foams comprise tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, 1,2,4-trichlorobenzene, and similar solvents or combinations thereof, as are known in the art. In one embodiment, decalin may be combined with polyethylene foam.

In some embodiments, the heating layer 41 comprises a conductive and/or resistive heating element 45 and a polymer substrate 47.

In various embodiments, the heating element 45 comprises metal or other notable conductive and/or resistive materials known in the art. The heating element 45 may be wire or mesh shaped, or a metal coating. For example, resistance wires, metal woven or non-woven wires, metal mesh, wire traces, sputter coatings or other heating elements 45 known in the art may be used.

In another embodiment, wire is insulated with polyethylene before attachment to the polymer substrate 47, for example, polyethylene insulated wire.

In some embodiments, the heating element 45 may be electrically heated or heated by other notable processes known in the art.

In some embodiments, the polymer substrate 47 comprises a polymer film, a polymer non-woven or a polymer mesh. The polymer substrate 47 comprises, for example, a polyolefin, a polyamide, a polyester, a polyvinyl chloride, a poly-acrylonitrile-butadiene-styrene, or combinations thereof. In one embodiment, the polymer substrate includes polyethylene. In various embodiments, the polymer substrate 47 may be heated above the melting point of the polymer substrate 47. In some embodiments, the polymer substrate 47 may become molten upon the application of heat.

In some embodiments, the polyethylene comprises low (LDPE), medium (MDPE), high density (HDPE), very high molecular weight (VHMWPE), ultra high molecular weight polyethylene (UHMWPE), or combinations thereof.

In some embodiments, the outer layer 43 may be the layer which will come in contact with the workpiece (e.g. pipe) to be repaired. In various embodiments, the outer layer 43 may be comprised of a suitable film that is homogenously or heterogeneously incorporated into the polymer adhesive layer, and further into the pipe being repaired. In one embodiment, the outer layer 43 comprises a polymer. The polymer may be polyethylene. In some embodiments, the polyethylene comprises low (LDPE), medium (MDPE), high density (HDPE), very high molecular weight (VHMWPE), ultra high molecular weight polyethylene (UHMWPE), or combinations thereof. In one embodiment, the polyethylene includes low density polyethylene (LDPE).

In some embodiments, upon application of heat, when the MLP 35 is applied to a workpiece, such as a polyethylene pipe to be repaired by a clamp tool, a zone or a portion of the pipe and a zone or a portion of the MLP 35 melts and/or changes to a molten state. In various embodiments, the surface of the pipe and the surface of the MLP 35 in contact with each other in the heating zone may be melted or molten upon heating. The cooler portion of the pipe (further away from the MLP 35) and the cooler portion of the MLP 35 (further away from the pipe) may remain in a solid phase, maintaining the integrity of the structure of the pipe and MLP 35. The melted or molten zone comprises a portion of the workpiece, outer surface of pipe, and a portion of the MLP 35 comprising the outer layer 43, the first and second polymer adhesive layers 39, a portion of the heating layer 41, and a portion of the backing layer 37. A portion of the backing layer 37 (cooler portion of the MLP 35) may remain in solid phase and may act to maintain the integrity of the structure of the MLP 35. The total molten zone comprising the portion of the pipe and the portion of the MLP 35 may be about 2 mm to about 6 mm thick, e.g., about 4 mm thick. In various embodiments, the molten zone may be about 4 mm thick, of which about 2 mm may be melted or molten pipe and 2 mm may be the melted or molten portion of the MLP 35 comprising the outer layer 43, the first and second polymer adhesive layers 39, a portion of the heating layer 41, and a portion of the backing layer 37. In various embodiments, about 2 mm of the backing layer 37 may be melted or molten. In some embodiments, the heating element 45 may remain in a solid phase. In some embodiments, a portion of the backing layer 37, may remain in solid phase.

In some embodiments, the backing layer 37 becomes heterogeneously or homogenously incorporated with the first polymer adhesive layer 39 upon application of heat. In various embodiments, the outer layer 43 becomes heterogeneously or homogenously incorporated with the second polymer adhesive layer 39 upon the application of heat. In other embodiments, the first polymer adhesive layer 39 and the second polymer adhesive layer 39 become heterogeneously or homogeneously incorporated with the heating layer 41 upon the application of heat.

MLP 35 may be applied to a plastic pipe with a Clamp and Repair Tool as described in U.S. Pat. Nos. 7,337,648 and 8,122,751 entitled "Clamp and Repair Tool" by Kenneth H. Green, issued on Mar. 4, 2008, and Feb. 28, 2012, respectively, and U.S. application Ser. Nos. 12/778,825, and 13/668, 882 filed on May 12, 2010 and Nov. 5, 2012, respectively, the contents of which are incorporated herein by reference in their entirety. For example, MLP 35 may be placed in the jaws of the clamp, connected to a programmable logic controller (PLC) and then contacted with the workpiece surface. Pressure and heat may be applied from the clamp tool and controlled by the PLC to accomplish the connection or repair.

Figure 6:
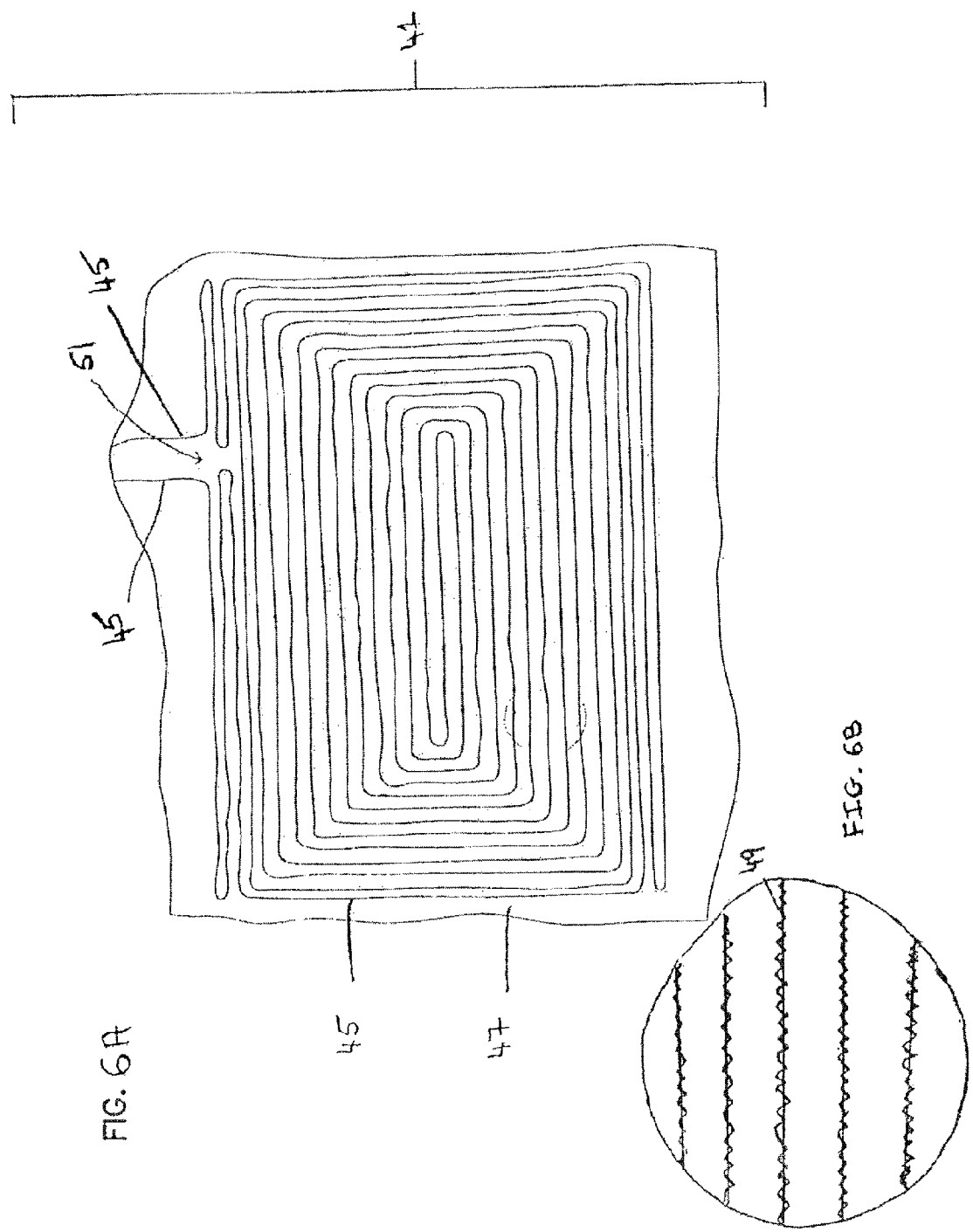
FIG. 6A depicts one aspect of the heating layer of the present disclosure including a raw heating element stitched to a polymer substrate in one exemplary pattern.
FIG. 6B depicts a close-up view thereof.

FIG. 6A depicts one aspect of the heating layer 41 of the present disclosure comprising a heating element 45 on a polymer substrate 47 in an exemplary pattern. Alternately, the heating element 45 may be arranged in any suitable pattern depending on the treatment effect desired. In some embodiments, the pattern comprises a pocket, gap, space or area 51 adjacent to or between the beginning and the end of the heating wires 45. The pocket area 51 may be described as the area between the heating wires 45 and the area at which the wires 45 exit the pattern. The heating element 45 may be attached to the polymer substrate 47. The attachment may be achieved by stitching, tacking, gluing, heating or other notable methods known in the art. Alternately, the heating element 45 may be molded into the polymer substrate 47 during the manufacturing process or may be sandwiched between layers of polymer substrate 47.

FIG. 6B depicts a close-up view of FIG. 6A illustrating stitching or sewing the heating element 45 to the polymer substrate 47 using stitches 49. In some embodiments, stitching may be performed with thread, for example, polymer thread. For example, about 8 mm to about 10 mm polyethylene thread available from Waltrich Plastics Corp. (Walthourville, Ga.) may be used to stitch the heating element 45 to the polymer substrate 47. The diameter of the thread(s) to secure the heating wires to the substrate may be chosen in view of the gauge of the heating wires as determined by one skilled in the art.

In some embodiments, the MLP comprises one or more digital or analog devices for monitoring, detecting, sensing or signaling a condition of said MLP.

In various embodiments, these devices or sensors 57 include those sensitive to conditions of temperature and/or pressure. Temperature sensors, thermal measuring devices, include for example, resistance temperature detectors (RTD) or thermocouples (TC) and similar devices known in the art. RTD and TC devices are available from Omega Engineering, Inc. (Stamford, Conn.). Sensors 57 measuring temperature and pressure may be monitored while applying the MLP 35 to a workpiece, such as a pipe (not shown). Alternately, sensors 57 may be provided for measuring other characteristics. Other monitoring devices or sensors remaining inside or on the patch, such as a radio-frequency identification device (RFID) 73 may be monitored after the MLP 35 has been applied to the workpiece. An RFID 73 may be used to locate the MLP 35 after the MLP 35 is hidden with the repaired substrate in general use, e.g., buried underground. It is to be understood by one of ordinary skill in the art, other suitable signal transmitting devices may be used in the MLP system.

The application of this system is not limited to pressure and thermal sensors 57 alone, and that additional digital or analog devices and/or sensors 57 with vibration or electrical fields may be added or used alone in the MLP system in any manner as may be standard for skilled practitioners of the art.

Figure 7:
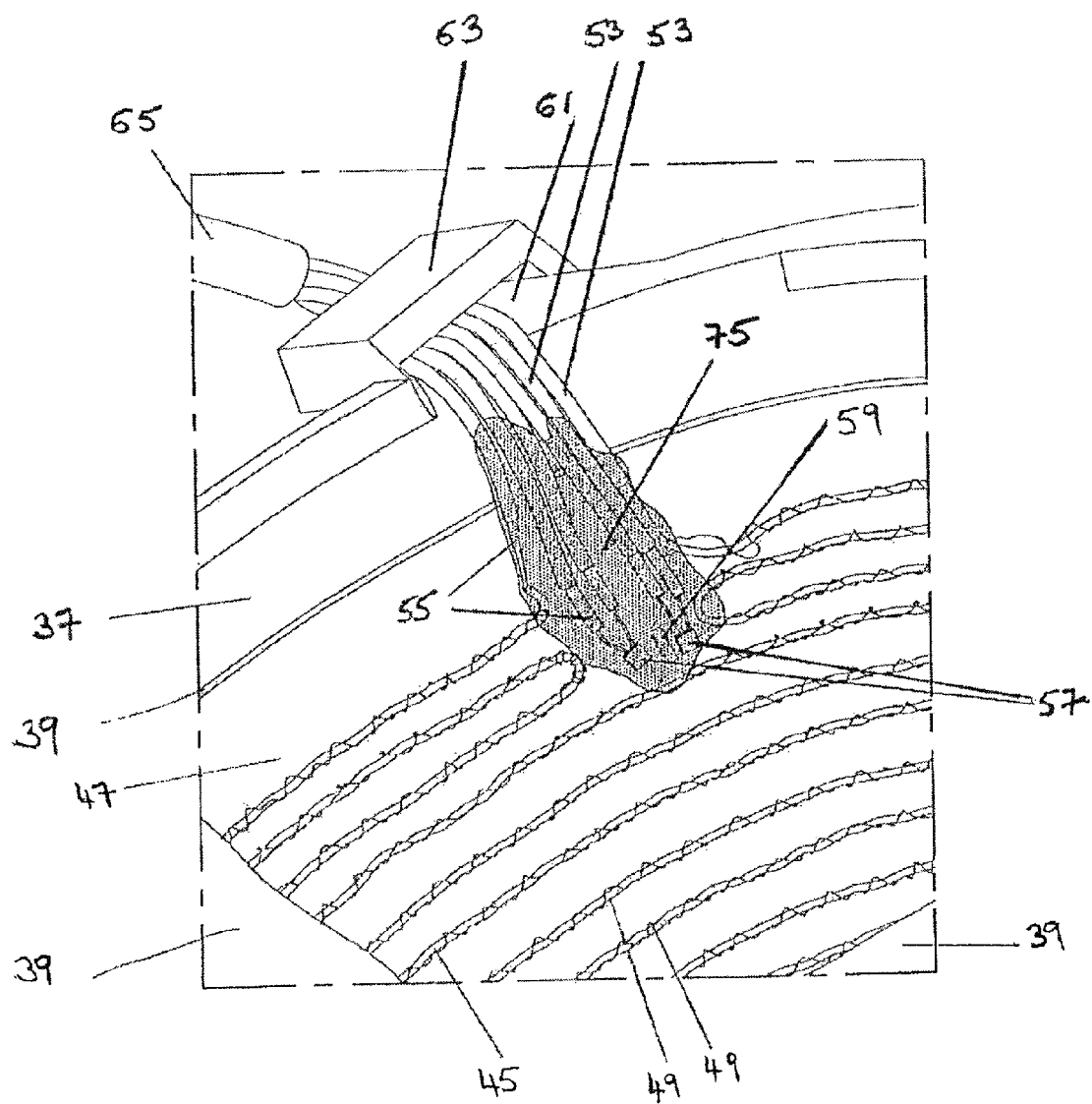
FIG. 7 depicts another aspect of an MLP including a heating element coupled to leads and sensors in a pocket.

In another embodiment, the heating layer 41 comprises at least one sensor 57. FIG. 7 depicts another aspect of a MLP 35 with part of the second polymer adhesive layer 39 and the outer layer 43 (not shown) pulled away exposing the heating layer 41. The exposed heating layer 41 comprises a heating element 45 coupled to leads 53 and sensor(s) 57 in a pocket area 51 of a pattern of the heating element 45 on the polymer substrate 47.

In some embodiments, the sensor(s) 57 may be located on the heating layer 41 during assembly of the MLP 35. In one embodiment, the sensor(s) 57 may be located in the pocket area 51 of the heating layer 41. A pocket area 51 in a pattern created by the heating element 45 may be used to place monitoring devices, such as RFID 73 (not shown), sensors 57 and spacers 59.

In some embodiments, the spacer(s), one or more spacers, 59 may be flat or curved, in a square, rectangular, circular on any shape that may serve as a cushion or bolster to keep the sensors, or RTD(s) 57 separated, and to ensure the RTD(s) 57 are not crushed during the compression stage, when the MLP 35 is applied to a pipe or workpiece. The spacers 59 comprise a polyethylene, a high modulus polyethylene fiber (SPECTRA® brand), a polyester, a nylon, or a polyaramide fiber (KEVLAR® brand), a fluoropolymer or combinations thereof. The spacers 59 may be selected such that the spacers 59 do not dissolve into the surrounding layers of the MLP 35 upon application of heat from the application tool.

The heating element 45, for example, a metal wire, metal mesh, wire traces, is operably coupled to one or more lead wires or leads 53 of a coupling device 65. FIG. 7 shows an example of a coupling device 65 with six leads 53. The leads 53 comprise for example, electrical leads or may include other notable connective and/or conductive connectors. The leads 53 may deliver electricity or other types of energy to the heating element 45. In various embodiments, the wires 45 may be operably coupled to the leads 53 with crimps 55. The RTDs 57 are also shown coupled to one or more leads 53 with crimps 55. The leads 53 may be seated under a strain relief tab 63, and on top of the backing tab 61 of the backing layer 37. In one embodiment, taping, gluing or other suitable attachment method such as using double-sided tape 75, for example, SCOTCH® Double Sided Tape available from 3M Company (St. Paul, Minn.), may be used to adhere the RTDs 57, crimps 55 and leads 53 to the pocket area 51 of the polymer substrate 47 of the heating layer 41. In some embodiments, an extra piece of polymer foam (not shown) or any suitable material, e.g., polymer substrate, such as polyethylene and the like, is sandwiched between pieces of double-sided tape 75.

Figure 8:
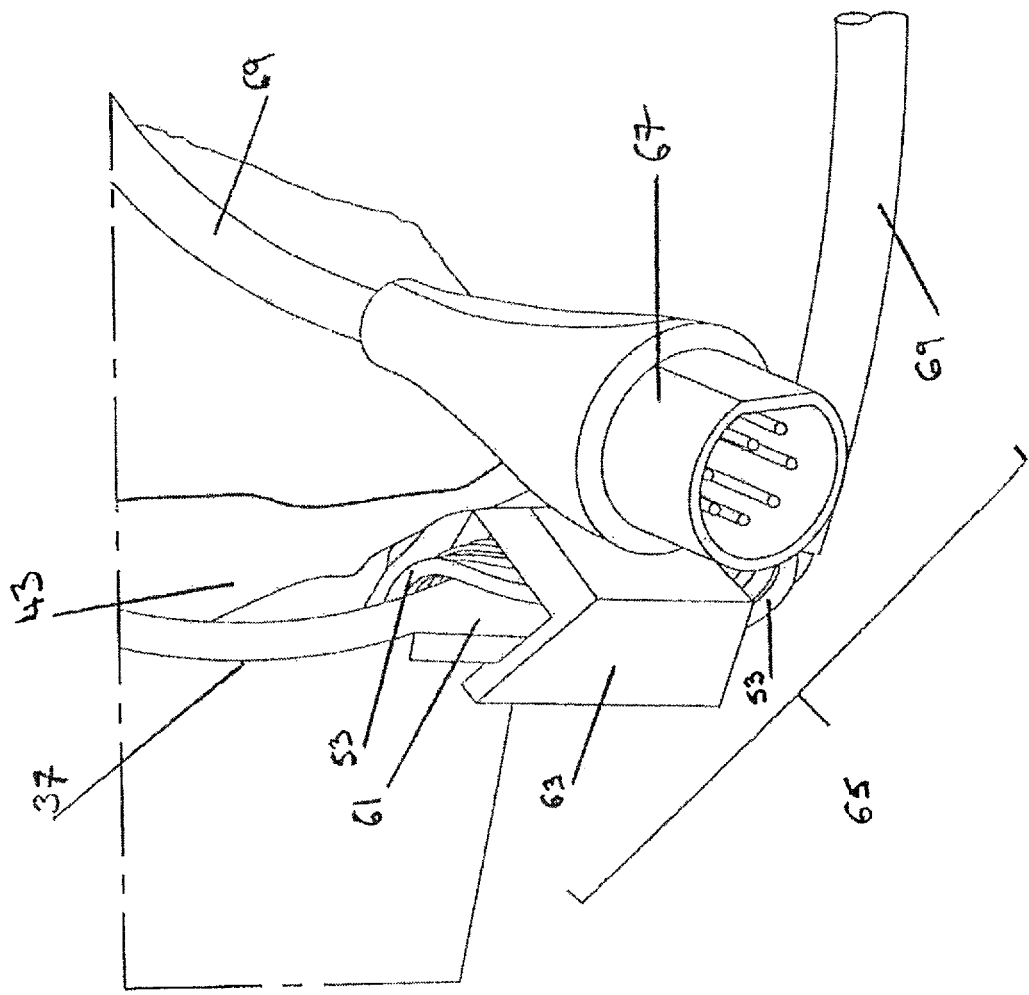
FIG. 8 depicts a close-up view of a coupling device attached to the MLP in accordance with some embodiments.

FIG. 8 depicts a close-up view of a coupling device 65 attached to the MLP 35 in accordance with some embodiments. The backing layer 37 and the outer layer 43 of the MLP 35 are shown. The coupling device 65 comprises an electrical coupling device. The electrical coupling device 65 comprises the lead(s) 53, a connector 67 at an end of the leads 53 and a cord 69 that may wrap around the leads 53. The connector 67 may be operably coupled to a tool used to apply the MLP 35 to a workpiece, such as a pipe (not shown). The backing layer 37 also includes a strain relief tab 63 and a backing tab 61 described further below.

Figure 9:
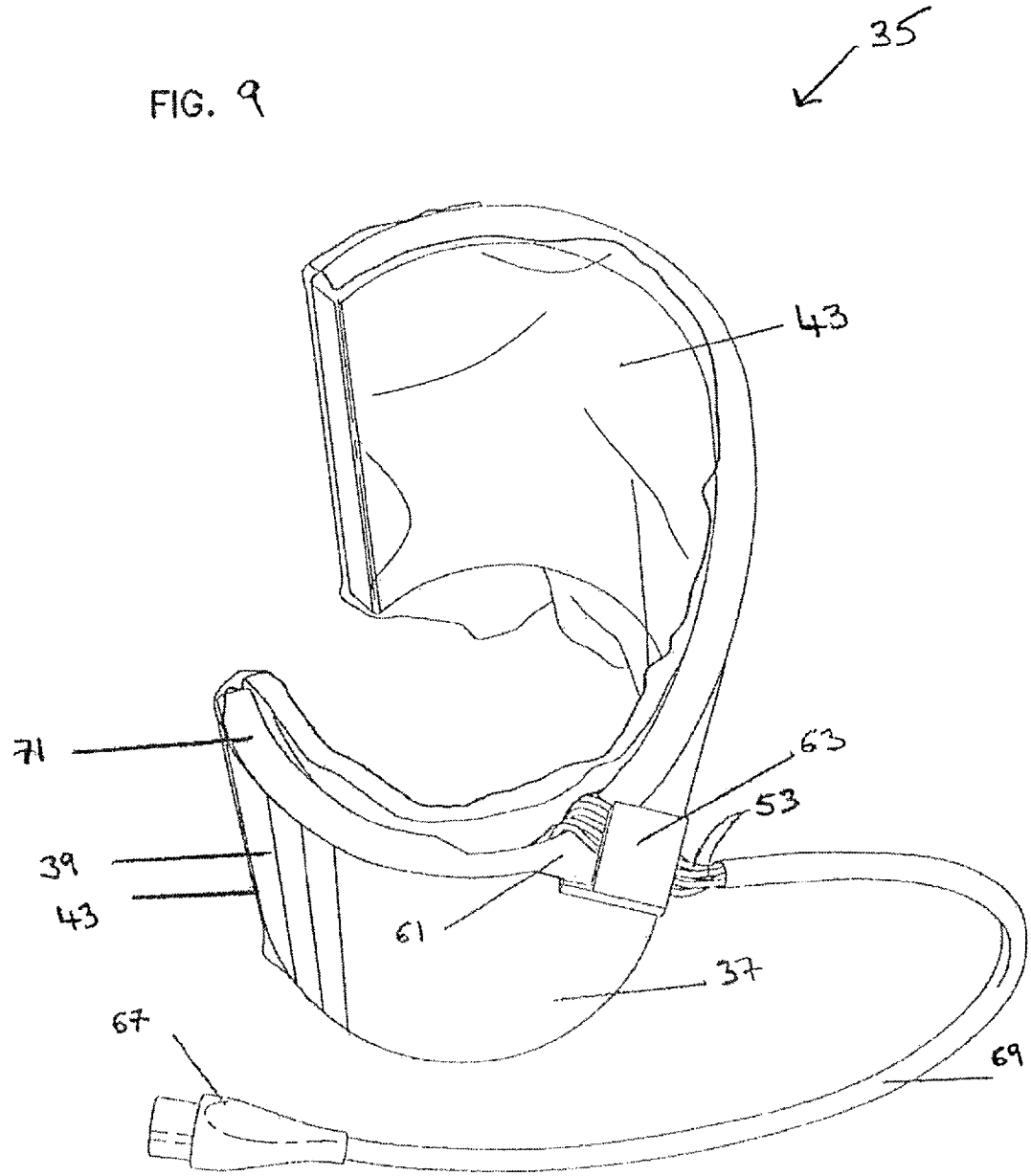
FIG. 9 depicts a perspective end view of the MLP in accordance with some embodiments.

FIG. 9 depicts a perspective end view of the MLP 35. The backing layer 37 and the outer layer 43 of the MLP 35 are shown. In various embodiments, part of the second polymer adhesive layer 39 may be folded back over the end of the backing layer 37, and may be visible to the eye through the outer layer 43. For example, if the outer layer 43 is LDPE film, the polymer adhesive layer 39 may be visible through the film 43. In some embodiments, the backing layer 37 optionally includes an lip, rim or flange 71 inwardly facing and substantially perpendicular to the backing layer 37. The lip 71 may act as a "wear surface" when the clamp tool is closing upon the MLP 35. The lip 71 may also aid in keeping the polymer substrate 47 and heating element 45 from folding or stretching during the application of the MLP 35 to the workpiece. In some embodiments, the backing layer 37 comprises a backing tab 61, which changes the surface of the inwardly facing lip 71 to the backing tab 61, which extends substantially perpendicular facing outward.

In various embodiments, a strain relief tab 63 is attached or molded on the backing tab 61, or on the backing layer 37. In various embodiments, the leads 53 of the 65 coupling device may thread through the space created by a living hinge in the strain relief tab 63, which folds over and may capture and hold the leads 53. The connector 67 at an end of the leads 53 and a cord 69 that wraps around the leads 53 are also shown.

Figure 10:
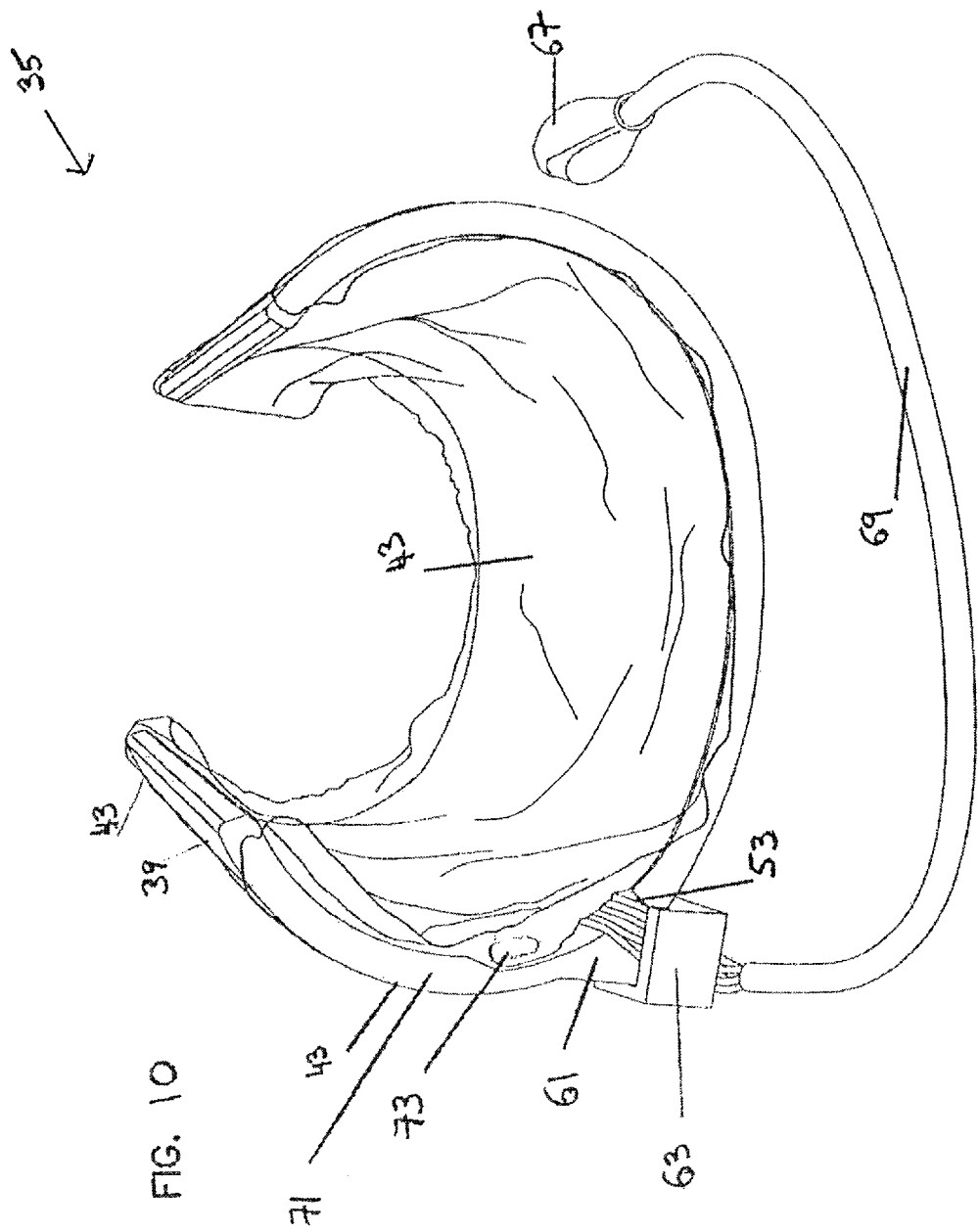
FIG. 10 depicts a perspective side view of the MLP including a radio-frequency identification device (RFID) in accordance with some embodiments.

FIG. 10 depicts a perspective side view of the MLP 35 comprising a radio-frequency identification device (RFID) 73. For example, RFID tags available from 3M Company (St. Paul, Minn.). In some embodiments, at least one RFID 73 including tags or chips may be placed on or in the MLP 35. A durable RFID 73 for the MLP 35 application may be solvent resistant or encapsulated. The RFID 73 may be helpful to locate the site of a workpiece previously repaired. In one embodiment, the RFID 73 is placed on the inside surface of the backing layer 37, above the top edge of the second polymer adhesive layer 39. In another embodiment, the RFID 73 is placed on the outside or inset on the outside surface (away from the pipe) of the backing layer 37 (not shown). The outer layer 43 may cover the RFID 73. The outer layer 43 may be LPDE film, which makes the RFID 73 underneath still visible in FIG. 10. In various embodiments, the RFID 73 may be located on the heating layer 41. In another embodiment, the RFID 73 may be located between any layer of the MLP 35. In a further embodiment, the RFID 73 may be attached to any outer surface of the MLP 35, by stitching, tacking, gluing, heating, or other means of attachment known in the art. The rim 71, the backing tab 61 and the strain relief tab 63 included in the backing layer 37 are also shown in FIG. 10. The leads 53 from the inside of the MLP 35 appear at the top of the backing layer 37 and are flexed through on top of the backing tab 61 and under the strain relief tab 63. The cord 69 that wraps around the leads 53 and the connector 67 at an end of the leads 53 are also shown. The coupling device 65 may be operably coupled to an application tool (not shown). The tool may be used to apply the MLP 35 to a workpiece, such as a pipe (not shown).

Patch Assembly Example

The heating layer 41 is prepared by stitching or sewing a heating element, e.g., a polyethylene insulated wire 45, to a polymer substrate, a polyethylene mesh 47, with polyethylene thread. An 8 mm polyethylene thread may be used on the "bobbin" side or under side of the polymer substrate 47, and a slightly heavier gauge thread, 10 mm polyethylene thread may be used on the top side of the polymer substrate 47, which holds the wire 45 in place. The diameter of the threads to secure the heating wires to the substrate 47 may be chosen in view of the gauge of the heating wires 45. A design chosen as substantially similar as shown in FIG. 6A, may provide uniform heating to the MLP 35. Although a variety of designs of heating elements 45 may be attached to the polymer substrate 47. Before use, the heating layer 41 is examined for proper design and spacing and the absence of defects. Design and/or spacing may be selected in accordance with, e.g., the overall size of the MLP 35. For example, the MLP 35 may be sized and shaped such that when applied to a workpiece using the clamping tool, the MLP 35 circumferentially surrounds a segment of the workpiece to be repaired. Alternatively, the MLP 35 may be sized and/or shaped to only partially surround segments of the workpiece to be repaired.

The heating layer 41 may be tested by connecting the heating element 45 to a FLUKE® digital multi-meter (DMM), available from Fluke Corporation (Everett, Wash.). The FLUKE® DMM may be used to verify, for example, that the connectivity and resistance of the heating element 45 is in the selected range, about 25-28 ohms.

The heating layer 41 may be trimmed so that the polymer substrate 47 is larger than the heating element 45. For example, the polymer substrate 47 may have about ¼" bordering both right and left sides of the heating element 45, and may have about 1" bordering the top side and bottom side of the heating element 45. The top of the heating element 45 in this example, is the side which will be operably connected to the leads 53. The polymer substrate 47 may be left as a larger part, so that the heating layer 41 may be stretched at the time of attachment to the backing layer 37.

The polymer foam 47 for the first polymer adhesive layer 39 may be cut using a template for convenience. The polymer foam 47 is optionally cut slightly larger than the heating layer 41. Not to be limited by theory, it is believed that the complete covering of the heating layer 41 by the polymer foam 47 may prevent hot spots forming when heating the MLP 35.

The polyethylene insulated wire 45 is stripped of its polyethylene covering about ½" from the ends of the heater element wires 45. The wire stripping may be done about 2" from the body of the heating element design. See FIG. 7. The stripped heater element wires 45 are attached to crimps 55. The other end of the crimps 55 are attached to leads 53 of an electrical coupling device.

RTD(s) 57 may be attached to other leads 53 of the electrical coupling device using crimps 55. Optionally, a marker may be added to the end of these leads 53 to aid the attaching the appropriate lead 53 to the RTD(s) 57. Electrical tape is optionally applied between the leads 53 at the base of the RTD(s) 57 as an aid in preventing shorting.

The polymer foam 47 for the first polymer adhesive layer 39, and the heating layer 41 are attached to the backing layer 37. The heating layer 41 may be placed on one side of the polymer foam 47. The other side of the polymer foam 47 is attached to the backing layer 37. The attachment of the polymer foam 47 to the backing layer 37 may be accomplished by taping, gluing or by other various notable attachment processes known in the art. One method of gluing is by applying a spray adhesive, e.g., 3M™ 90 Hi-Strength Spray Adhesive, available from, 3M Company (St. Paul, Minn.) to one side of the polymer foam 47, positioning the heating layer 41 on the other side of the polymer foam 47 and then placing the adhesive coated side of the polymer foam 47 on to the backing layer 37 while optionally aligning the leads 53 with an optional backing tab 61 on backing layer 37. The backing layer 37 may be pre-formed and shaped to fit on the damaged workpiece. The backing layer 37 may be formed by injection molding.

The RTD(s) 57, are placed in the pocket 51 of the heating layer 41. The RTD(s) 57 may be marked to distinguish which side should be placed upwards. For example, the marked (often colored blue) side, of the RTD(s) 57 are facing away from the backing layer 37. Optionally, an extra piece of polymer foam with pieces of double sided adhesive tape 75 on both sides of the foam is placed on the pocket 51 of the heating layer. The RTD(s) 57 are placed on one side of the adhesive tape 75, about ⅛" to about ½", e.g., about ¼" from the edge of the loop wire (the wire leads at the point of exiting the MLP) and about ⅛" to about ½", e.g., about ¼" from the inner trace (the first long trace of the heating element, itself). Optionally, a spacer 59 is placed between RTDs 57. The spacer 59 may keep the RTDs 57 separated and protected from being crushed. The spacers 59 comprise nylon.

The leads 53 are optionally secured to the backing layer 37 by snapping shut the strain relief tab 63 over the leads 53. See FIG. 7.

The polymer foam 47 for the second polymer adhesive layer 39 may be cut to the desired size using a another template for convenience. The polymer foam 47 is optionally cut slightly larger than the heating layer 41.

Optionally, an RFID may be applied to the MLP 35. The RFID may be located in any layer of the MLP 35. The RFID may be placed on the backing layer 37 and is optionally covered by either the second polymer adhesive layer 39 and/or subsequent layers. For example, the RFID 73 may be placed on the inside surface of the backing layer 37, above the top edge of the second polymer adhesive layer 39. Alternately, the RFID 73 may be placed on the outside or inset/inlaid on the outside surface (away from the pipe) of the backing layer 37.

Double-sided adhesive tape, for example, SCOTCH® Double Sided Tape, available from 3M Company (St. Paul, Minn.), may be added around the border of the polymer foam 47. The second polymer adhesive layer 39 may be then tacked securely on top of the heating layer 41 and on to the backing layer 37, with the heating layer 41 and the first polymer adhesive layer 39 already in place.

The outer layer 43 is applied to the MLP 35. The outer layer 43 may be LDPE film. The LDPE film 43 may be trimmed to the desired size to cover the second polymer adhesive layer 39 to help the patch slide into place onto any workpiece without sticking to the workpiece too early during the application process. The LDPE film 43 may be attached to the MLP 39 by taping, gluing or by other various attachment processes known in the art. One method of gluing is by applying a spray adhesive to the second polymer adhesive layer and pressing on the LDPE film 43 onto the adhesive. Tape, for example, SCOTCH® Box Sealing Tape, available at 3M Company (St. Paul, Minn.), may be additionally used to adhere the LDPE film 43 to the backing layer 37. The LDPE film 43 may cover the optional, RFID 73.

The heating layer 41 may be re-tested by connecting the heating element 45 to the FLUKE® DMM to verify that the heating element's 45 connectivity and resistance is still in the correct range, about 25-28 ohms.

The location/status of the embedded RFID 73 may be tested by an RFID reader. The embedded RFID is chosen to be resistant to the particular solvent(s) used.

The MLP 35 is ready for inoculation with solvent. Solvent may be applied to the polymer foam of the polymer adhesive layers 39. Suitable solvents comprise tetralin, decalin, tetrachloroethylene, tetrachloroethane, xylene, cyclohexane, diethylether, dichloromethane, methylene chloride, methyl ethyl ketone, tetrahydrofuran, benzene, toluene, 1-chloronaphthalene, cyclohexanone, m-cresol, ethylcyclohexane, heptane, nonane, 1,2,4-trichlorobenzene or combinations thereof. Alternatively, any similar solvents, as are known in the art, may be employed.

Solvent may be applied or introduced by using a solvent connection/injection port or opening, a breakable ampoule or vial, or any suitable method for introducing solvent to the patch. For example, solvent may be injected from a syringe into the polymer foam. A solvent, such as decalin is absorbed by polyethylene foam of the polymer adhesive layers 39 and may fully saturate the polymer foam before using the MLP 35. The solvent may also saturate about 1 mm to about 3 mm, e.g., about 2 mm depth of the backing layer 37 and about 1 mm to about 3 mm, e.g., about 2 mm depth of the external workpiece (pipe) wall. The amount of solvent used and depth reached on the MLP 35 and pipe may vary with the size of the MLP 35 and pipe. For example, about 90 cubic centimeters (cc) of solvent is used on a MLP 35, which may be used to repair a leak on a 4-inch diameter pipe. The solvent may be applied to the MLP 35 at room temperature or ambient temperature.

The MLP 35 is ready for use with an application tool.

Example Preparation Methods: Gel

Polyethylene is weighed out to produce 6 wt %, 8 wt %, or 10 wt % (% polymer) gels. 50 ml of gel at a time are generally produced at a time, so 3, 4, or 5 grams of polyethylene are weighed out and placed in a 100 ml round-bottom flask respectively. The polyethylene can be low (LDPE), medium (MDPE), high density (HDPE), ultrahigh molecular weight (UHMWPE), or combinations thereof.

Decalin is added to the flask to produce 50 grams of total gel. This is the weight of the polyethylene and decalin combined.

An oil bath is heated to, and maintained at, 145° C. The oil bath sits on top of a stir plate. A stir bar is placed in the round bottom flask and is stirred during the process.

The decalin/polyethylene mixture is maintained at 145° C. for 2 hours, and is then allowed to cool.

The gel is labeled and stored until it is time to make a gel film.

When it is time to make the gel film a small amount of gel is placed in a 50 ml round bottom flask and heated to 145° C.

Once the gel reaches temperature, it is poured onto a mold and pressed flat. The resulting gel film is allowed to cool for about 20 minutes.

A piece of polyethylene film to be used as an envelope is placed flat on the work area. The film used in the tests summarized below is commonly available LDPE "plastic wrap" that can be purchased at grocery stores. Other densities of polyethylene can be used. The piece of film should be large enough to completely cover the top and bottom of the preformed gel layer, plus enough margin to allow the edges to be sealed.

The preformed polyethylene gel is slid from the mold onto the plastic wrap. The plastic wrap is folded over, so the gel is completely covered with one layer of plastic wrap. The resulting barrier film envelope consists of a single layer of LDPE film upon which a layer of gel sits; with another layer of LDPE film covering the top of the gel. The LDPE film is pressed close around the three open edges.

Example Gel Lap-Shear Test Methods and Results

The prepared gel is placed between two layers of polyethylene substrate to be adhered. The substrate "sandwich" is placed in a frame to provide proper alignment during the curing process.

The frame and lap-shear samples are placed into a preheated press. Example test temperatures were between about 105 and about 120° C. The range of applied pressures was from about 5 to about 50 psi. The bond formation process takes a minimum of about 20 minutes at the set temperature. The lap-shear sample is allowed to cool to room temperature before testing. Representative examples are provided in Table 2.

Generally, HDPE substrates were bonded using the gel adhesive in a heated platen equipped Carver press with test sample thicknesses, pressures, and temperatures varied. The samples were prepared using a modified version of the ASTM standards D3163, D3165, and D5868. For the results shown in Table 2, the modified parameters were: overlap=0.5" square inches (1" wide×0.5"long), pull rate=0.5"/min, substrate thickness=3/16", 3/16" Backers are glued to the back of the substrate to keep samples in shear, as provided by the ASTM standard. The substrate sheets were cut into pieces for overlap shear tests according to ASTM standards. The substrate pieces that were used for the lap-shear tests were 4.5"× 1"×3/16". Spacers were 4"×1"×3/16", and doublers were 3.5"× 1"×3/16".

film material) and the bath is allowed to equilibrate for about 1 hour. If the bath is already hot, but the decalin containers are not, at least 30 minutes is allowed for the decalin in these containers to reach the bath's set point temperature. The hot decalin temperature in each container is measured prior to the start of each batch of film samples.

TABLE 2

| Substrate | Gel Polymer | Gel Solvent | Film Material | Gel Weight Percent | Patch Thickness | Cure Temperature (° C.) | Cure Time (hours) | Pressure (gauge) (PSIG) | Failure Mode | Comments | Shear Strength |
|---|---|---|---|---|---|---|---|---|---|---|---|
| HDPE | HDPE | Decalin | LDPE | 6 | 0.81 | 110 | 1.5 | 40 | Cohesive | | 512 |
| HDPE | HDPE | Decalin | LDPE | 6 | 0.81 | 110 | 1.5 | 40 | Cohesive | | 572 |
| HDPE | HDPE | Decalin | LDPE | 8 | 1 | 115 | 1.5 | 30 | Cohesive | | 812 |
| HDPE | HDPE | Decalin | LDPE | 8 | 1 | 115 | 1.5 | 30 | Cohesive | | 502 |
| HDPE | HDPE | Decalin | LDPE | 8 | 1 | 115 | 1.5 | 30 | Cohesive | | 492 |
| HDPE | HDPE | Decalin | LDPE | 6 | 1.19 | 120 | 1.5 | 20 | Cohesive | | 816 |
| HDPE | HDPE | Decalin | LDPE | 6 | 1.19 | 120 | 1.5 | 20 | Cohesive | | 744 |
| HDPE | HDPE | Decalin | LDPE | 6 | 1.19 | 120 | 1.5 | 20 | Cohesive | | 794 |
| HDPE | HDPE | Decalin | LDPE | 10 | 0.81 | 120 | 1.5 | 40 | Cohesive | | 853 |
| HDPE | HDPE | Decalin | LDPE | 10 | 0.81 | 120 | 1.5 | 40 | Cohesive | | 689 |
| HDPE | HDPE | Decalin | LDPE | 8 | 0.81 | 120 | 1.5 | 40 | Cohesive | | 629 |
| HDPE | HDPE | Decalin | LDPE | 8 | 0.81 | 110 | 1.5 | 40 | Cohesive | | 629 |
| HDPE | HDPE | Decalin | LDPE | 8 | 0.81 | 110 | 1.5 | 40 | Cohesive | | 502 |
| HDPE | HDPE | Decalin | LDPE | 8 | 0.66 | 115 | 1.5 | 30 | Cohesive | | 527 |
| HDPE | HDPE | Decalin | LDPE | 8 | 0.66 | 115 | 1.5 | 30 | Cohesive | | 520 |
| HDPE | HDPE | Decalin | LDPE | 10 | 1.19 | 110 | 1.5 | 20 | Cohesive | | 463 |
| HDPE | HDPE | Decalin | LDPE | 10 | 1.19 | 110 | 1.5 | 20 | Cohesive | | 323 |
| HDPE | HDPE | Decalin | LDPE | 10 | 0.81 | 120 | 1.5 | 20 | Cohesive | | 593 |
| HDPE | HDPE | Decalin | LDPE | 10 | 0.81 | 120 | 1.5 | 20 | Cohesive | | 566 |
| HDPE | HDPE | Decalin | LDPE | 10 | 1.19 | 110 | 1.5 | 40 | Cohesive | | 388 |
| HDPE | HDPE | Decalin | LDPE | 10 | 1.19 | 110 | 1.5 | 40 | Cohesive | | 489 |
| HDPE | HDPE | Decalin | LDPE | 8 | 1 | 115 | 1.5 | 30 | Cohesive | | 447 |
| HDPE | HDPE | Decalin | LDPE | 8 | 1 | 115 | 1.5 | 30 | Cohesive | | 541 |
| HDPE | HDPE | Decalin | LDPE | 8 | 1.34 | 115 | 1.5 | 30 | Cohesive | | 470 |
| HDPE | HDPE | Decalin | LDPE | 8 | 1.34 | 115 | 1.5 | 30 | Cohesive | | 527 |
| HDPE | HDPE | Decalin | LDPE | 8 | 1 | 115 | 1.5 | 46.8 | Cohesive | | 554 |
| HDPE | HDPE | Decalin | LDPE | 8 | 1 | 115 | 1.5 | 46.8 | Cohesive | | 425 |
| HDPE | HDPE | Decalin | LDPE | 6 | 0.81 | 110 | 1.5 | 20 | Cohesive | | 551 |
| HDPE | HDPE | Decalin | LDPE | 6 | 0.81 | 110 | 1.5 | 20 | Cohesive | | 503 |
| HDPE | HDPE | Decalin | LDPE | 6 | 1.19 | 120 | 1.5 | 40 | Cohesive | | 642 |
| HDPE | HDPE | Decalin | LDPE | 6 | 1.19 | 120 | 1.5 | 40 | Cohesive | | 702 |
| HDPE | HDPE | Decalin | LDPE | 8 | 1 | 123 | 1.5 | 30 | Cohesive | | 672 |
| HDPE | HDPE | Decalin | LDPE | 8 | 1 | 123 | 1.5 | 30 | Cohesive | | 698 |
| HDPE | HDPE | Decalin | LDPE | 8 | 1 | 106 | 1.5 | 30 | Cohesive | | 324 |
| HDPE | HDPE | Decalin | LDPE | 8 | 1 | 106 | 1.5 | 30 | Cohesive | | 314 |
| HDPE | HDPE | Decalin | LDPE | 11.4 | 1 | 115 | 1.5 | 30 | Cohesive | | 606 |
| HDPE | HDPE | Decalin | LDPE | 11.4 | 1 | 115 | 1.5 | 30 | Cohesive | | 674 |
| HDPE | HDPE | Decalin | LDPE | 4.6 | 1 | 115 | 1.5 | 30 | Cohesive | | 641 |
| HDPE | HDPE | Decalin | LDPE | 6 | 0.81 | 115 | 1.5 | 20 | Adhesive/Cohesive | Not enough gel | 474 |
| HDPE | HDPE | Decalin | LDPE | 8 | 0.81 | 115 | 1.5 | 20 | Cohesive | | 783 |
| HDPE | HDPE | Decalin | LDPE | 10 | 0.81 | 115 | 1.5 | 40 | Cohesive | | 759 |
| HDPE | HDPE | Decalin | LDPE | 6 | 0.81 | 115 | 1.5 | 40 | Cohesive | | 678 |
| HDPE | HDPE | Decalin | LDPE | 8 | 0.81 | 115 | 1.5 | 40 | Cohesive | | 631 |
| HDPE | HDPE | Decalin | LDPE | 8 | 1 | 120 | 1.5 | 30 | Cohesive | aged 1 week | 728 |
| HDPE | HDPE | Decalin | LDPE | 8 | 1 | 120 | 1.5 | 30 | Cohesive | aged 1 week | 638 |
| HDPE | HDPE | Decalin | LDPE | 8 | 1 | 120 | 1.5 | 30 | Cohesive | aged 2 weeks | 680 |
| HDPE | HDPE | Decalin | LDPE | 8 | 1 | 120 | 1.5 | 30 | Cohesive | aged 2 weeks | 669 |
| HDPE | HDPE | Decalin | LDPE | 8 | 1 | 120 | 1.5 | 30 | Cohesive | aged 4 weeks | 641 |
| HDPE | HDPE | Decalin | LDPE | 8 | 1 | 120 | 1.5 | 30 | Cohesive | aged 4 weeks | 629 |
| HDPE | HDPE | Decalin | LDPE (0.04") | 6 | 0.81 | 115 | 1.5 | 20 | Cohesive | | 725 |

HDPE = High density polyethylene (e.g., 3/16" HDPE sheeting from McMaster Carr.)
LDPE = Low density polyethylene (e.g., a Fred Meyer brand plastic wrap.)
Cure temperature is in degrees Celsius.
Cure Time is in hours.
Pressure refers to the gauge pressure on the Carver Press during cure.
"Failure Mode" is intended to encompass two basic failure modes recognized in adhesion science: adhesive failure, which means that the failure occurred in the boundary between the adhesive and the substrate, and cohesive failure, which means that the failure occurred either entirely in the substrate or entirely in the adhesive. The failures occurred entirely in the adhesive (except for the one sample without enough gel, in which the failure was both cohesive and adhesive).
Shear strength was determined using one of ASTM D3163, D3165, and D5868.

Example Preparation Methods: Polyethylene Swollen Film

A glass container/s containing decalin is inserted into the holding rack of the oil bath. The oil bath temperature is set to 101 to 105° C. (the temperature varies with the polyethylene film material) and the bath is allowed to equilibrate for about 1 hour. If the bath is already hot, but the decalin containers are not, at least 30 minutes is allowed for the decalin in these containers to reach the bath's set point temperature. The hot decalin temperature in each container is measured prior to the start of each batch of film samples.

A piece of film of desired size is cut (the film samples will swell ~50-60% in all directions). The polyethylene can be low (LDPE), medium (MDPE), high density (HDPE), very high molecular weight (VHMWPE), ultra high molecular weight (UHMWPE), or combinations thereof.

The film is placed into the hot glass decalin container, making sure the film is fully submerged into the hot decalin. The hot decalin temperature in each container is measured and documented prior to the start of each batch of film samples.

lap=0.5 square inches (1" wide×0.5"long), pull rate=1"/min, substrate thickness=3/8". The substrate sheets were cut into pieces for overlap shear tests according to ASTM standards. The substrate pieces that were used for the lap-shear tests were 4"×1"×3/8".

TABLE 3

| Substrate | Swollen Film | Film Solvent | Film Material | Film Weight Percent | Cure Temperature (° C.) | Cure Time (hours) | Pressure (gauge) (PSIG) | Failure Mode | Comments | Shear Strength |
|---|---|---|---|---|---|---|---|---|---|---|
| HDPE | UHMWPE | Decalin | none | 60 | 121 | 90 | 20 | Adhesive | | 650 |
| HDPE | UHMWPE | Decalin | none | 60 | 121 | 90 | 20 | Adhesive | | 675 |
| HDPE | UHMWPE | Decalin | none | 60 | 121 | 90 | 20 | Adhesive | | 450 |
| HDPE | UHMWPE | Decalin | none | 40 | 121 | 90 | 20 | A-C | | 890 |
| HDPE | UHMWPE | Decalin | none | 40 | 121 | 90 | 20 | A-C | | 820 |
| HDPE | UHMWPE | Decalin | none | 40 | 121 | 90 | 20 | A-C | | 680 |
| HDPE | UHMWPE | Decalin | none | 20 | 121 | 90 | 20 | Cohesive | | 1300 |
| HDPE | UHMWPE | Decalin | none | 20 | 121 | 90 | 20 | Cohesive | | 1520 |
| HDPE | UHMWPE | Decalin | none | 20 | 121 | 90 | 20 | Cohesive | | 1280 |
| HDPE | HDPE | Decalin | none | 75 | 121 | 90 | 20 | Adhesive | Pretest fail | 0 |
| HDPE | HDPE | Decalin | none | 75 | 121 | 90 | 20 | Adhesive | | 375 |
| HDPE | HDPE | Decalin | none | 75 | 121 | 90 | 20 | Adhesive | | 440 |
| HDPE | HDPE | Decalin | none | 60 | 121 | 90 | 20 | Adhesive | | 430 |
| HDPE | HDPE | Decalin | none | 60 | 121 | 90 | 20 | Adhesive | | 460 |
| HDPE | HDPE | Decalin | none | 60 | 121 | 90 | 20 | Cohesive | | 600 |
| HDPE | HDPE | Decalin | none | 40 | 121 | 90 | 20 | A-C | | 860 |
| HDPE | HDPE | Decalin | none | 40 | 121 | 90 | 20 | A-C | | 960 |
| HDPE | HDPE | Decalin | none | 40 | 121 | 90 | 20 | A-C | | 780 |
| HDPE | HDPE | Decalin | none | 20 | 121 | 90 | 20 | Cohesive | | 1240 |
| HDPE | HDPE | Decalin | none | 20 | 121 | 90 | 20 | Cohesive | | 1390 |
| HDPE | HDPE | Decalin | none | 20 | 121 | 90 | 20 | Cohesive | | 1240 |
| HDPE | HDPE | Decalin | none | 30 | 121 | 90 | 20 | Adhesive | | 500 |
| HDPE | HDPE | Decalin | none | 30 | 121 | 90 | 20 | Adhesive | | 1020 |
| HDPE | HDPE | Decalin | none | 30 | 121 | 90 | 20 | Adhesive | | 550 |

The film is allowed to swell for the desired time period (a baseline of 40 minutes for 20 wt % using 0.020" UHMWPE film). Weight percent is based on polymer content.

Once the desired swelling time is reached, the film is removed from the hot decalin with tweezers and plunged directly into a bottle of clean decalin that was kept in the freezer. The freezer bottle (with sample) is placed back into the freezer for at least 5 minutes.

Using tweezers, the chilled film sample is removed from the freezer bottle and placed into a closeable glass container or folded into LDPE or aluminum foil envelope and labeled.

Example Polyethylene Swollen Film Shear Test Methods and Results

The prepared swollen film is placed between two layers of polyethylene substrate to be adhered. The substrate "sandwich" is placed in a frame to provide proper alignment during the curing process.

The frame and lap-shear samples are placed into a preheated press. In order to simulate field conditions some lap-shear samples are made without preheating the press platens. Example test temperatures were between 110 and 120° C. The range of applied pressures was 5 to 50 psi. The bond formation process takes a minimum of about 20 minutes at the set temperature. The lap-shear sample is allowed to cool to room temperature before testing. Representative examples are provided in Table 3.

Generally, HDPE substrates were bonded using the swollen film adhesive in a heated platen equipped Carver press with test sample thicknesses, pressures, and temperatures varied. The samples were prepared using a modified version of the ASTM standards D3163, D3165, and D5868. For the results shown in Table 2, the modified parameters were: over- Embodiments, including preferred embodiments, have been presented in this application for the purpose of illustration and description. They are not intended to be exhaustive or to limit the invention to the precise forms and steps disclosed. The embodiments were chosen and described to illustrate the principles of the invention and the practical application thereof, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A multi-layered patch comprising:
    a backing layer;
    a first polymer adhesive layer comprising a polymer foam and a solvent;
    a heating layer comprising a polymer substrate, a heating element and at least one sensor;
    a second polymer adhesive layer comprising a polymer foam and a solvent; and
    an outer layer.

2. The multi-layer patch of claim 1, further comprising a solvent injection port.

3. The multi-layer patch of claim 1, wherein the heating element comprises metal wire, metal mesh or wire traces.

4. The multi-layer patch of claim 1, wherein the heating element is attached to the polymer substrate by stitching.

5. The multi-layer patch of claim 4, wherein the heating element is stitched onto the polymer substrate in a pattern comprising at least one pocket area.

6. The multi-layer patch of claim 5, wherein the at least one sensor is in the at least one pocket area.

7. The multi-layer patch of claim 1, wherein the at least one sensor comprises at least one thermal measuring device.

8. The multi-layer patch of claim 1, wherein the polymer substrate comprises polyethylene.

9. The multi-layer patch of claim 1, wherein the polymer substrate comprises a polymer film, a polymer non-woven fabric or a polymer mesh.

10. The multi-layer patch of claim 1, wherein the solvent in the first polymer adhesive layer or the second polymer adhesive layer comprises decalin, tetralin, tetrachloroethylene, tetrachloroethane, xylene, or combinations thereof.

11. The multi-layer patch of claim 1, wherein the polymer foam of the first polymer adhesive layer or the second polymer adhesive layer is saturated with the solvent.

12. The multi-layer patch of claim 1, wherein the polymer foam of the first polymer adhesive layer or the second polymer adhesive layer comprises polyethylene.

13. The multi-layer patch of claim 12, wherein the polyethylene of the first polymer adhesive layer or the second polymer adhesive layer comprises low density polyethylene, medium density polyethylene, high density polyethylene, ultrahigh molecular weight polyethylene or combinations thereof.

14. The multi-layer patch of claim 1, wherein the backing layer, the polymer substrate of the heating layer, or the outer layer comprises low density polyethylene, medium density polyethylene, high density polyethylene, ultrahigh molecular weight polyethylene or combinations thereof.

15. The multi-layer patch of claim 1, wherein the heating element is an electrically heated element.

16. The multi-layer patch of claim 1, further comprising a radio-frequency identification device.

17. A multi-layered patch comprising:
a backing layer comprising a polymer;
a first polymer adhesive layer comprising a combination of polyethylene foam and solvent at room temperature;
a heating layer comprising a polymer substrate, a heating element and a thermal measuring device;
a second polymer adhesive layer comprising a combination of polyethylene foam and solvent at room temperature; and
an outer layer comprising a polymer.

18. The multi-layer patch of claim 17, wherein the at least one thermal measuring device comprises at least one resistance temperature detector, thermocouple, or combinations thereof.

19. A multi-layer patch comprising:
a backing layer comprising polyethylene;
a first polymer adhesive layer comprising a combination of high density and ultrahigh molecular weight polyethylene foam and solvent at room temperature;
a heating layer comprising polyethylene, an electrically heated element and at least one thermal measuring device;
a second polymer adhesive layer comprising a combination of high density and ultrahigh molecular weight polyethylene foam and solvent at room temperature; and
an outer layer comprising polyethylene.

20. The multi-layer patch of claim 19, further comprising a radio-frequency identification device.

* * * * *